Patented Nov. 17, 1925.

1,561,535

UNITED STATES PATENT OFFICE.

HANS HAHL, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND.

No Drawing. Original application filed December 10, 1924, Serial No. 755,059. Divided and this application filed June 27, 1925. Serial No. 40,103.

*To all whom it may concern:*

Be it known that I, HANS HAHL, a citizen of Germany, residing at Elberfeld, in the State of Prussia, Germany, have invented new and useful Improvements in Pharmaceutical Compounds, of which the following is a specification.

The present invention concerns the production of the hitherto unknown salts of alkali metals of complex antimony compounds being derived from mercapto-carboxylic acids e. g. the antimony sodium salt of thiosalicylic acid having most probably the formula:

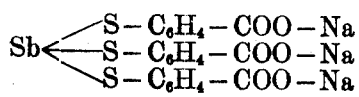

They are slightly yellowish to whitish powders of a weak alkaline reaction soluble in water, being valuable spirillocides.

In order to illustrate the new process more fully the following example is given:—

An aqueous solution of 20 parts by weight of thiosalicylic acid is neutralized with sodium carbonate and the resulting neutral hot solution is saturated with freshly precipitated antimony oxide $Sb(OH)_3$. The liquid is filtered and the filtrate is evaporated to dryness. The sodium antimony salt is a yellowish powder soluble in hot water with a weak alkaline reaction. By treatment with $Na_2S$ the antimony is precipitated.

The other alkali metal salts are prepared in an analogous manner.

The antimony sodium salt of the thioglycollic acid is for instance obtained by neutralizing the acid solution of the reaction product from thioglycollic acid and antimony oxide $Sb_2O_3$ with sodium carbonate. It is a slightly yellowish powder soluble in water of a weak alkaline reaction.

This is a division of the application Ser. No. 755,059, filed December 10, 1924.

I claim:—

1. The process of producing alkali metal salts of complex antimony compounds of mercapto-carboxylic acids, which process consists in treating the mercapto-carboxylic acid with an oxy derivative of the trivalent antimony and neutralizing the resulting product with a suitable alkali metal compound, substantially as described.

2. The herein described alkali metal salts of complex antimony compounds of mercapto carboxylic acids, being slightly yellowish powders soluble in water with a weakly alkaline reaction and being valuable spirillocides, substantially as described.

3. The herein described sodium salt of the complex antimony compound of the thiosalicylic acid having most probably the following formula:

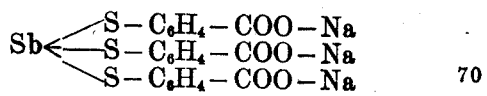

being a yellowish powder, soluble in water with a weakly alkaline reaction and being a valuable spirillocide, substantially as described.

In testimony whereof I have hereunto set my hand.

HANS HAHL.